G. F. FILLEY.

Cooking Stove.

No. 873. Reissued Dec. 27, 1859.

THE NORRIS PETERS CO., PHOTO-LITHO., WASHINGTON, D. C.

UNITED STATES PATENT OFFICE.

GILES F. FILLEY, OF ST. LOUIS, MISSOURI.

IMPROVEMENT IN COOKING-STOVES.

Specification forming part of Letters Patent No. 9,788, dated June 14, 1853; Reissue No. 873, dated December 27, 1859.

*To all whom it may concern:*

Be it known that I, GILES F. FILLEY, of the city and county of St. Louis, and State of Missouri, have invented sundry new and useful improvements in that description of cooking-stoves whose ovens extend forward underneath the fire-chamber, or underneath both the fire-chamber and a portion or the whole of the hearth-plate; and I do hereby declare that the following is a full and exact description of said improvements, reference being had to the accompanying drawings, which form a part of this specification.

Figure 1:
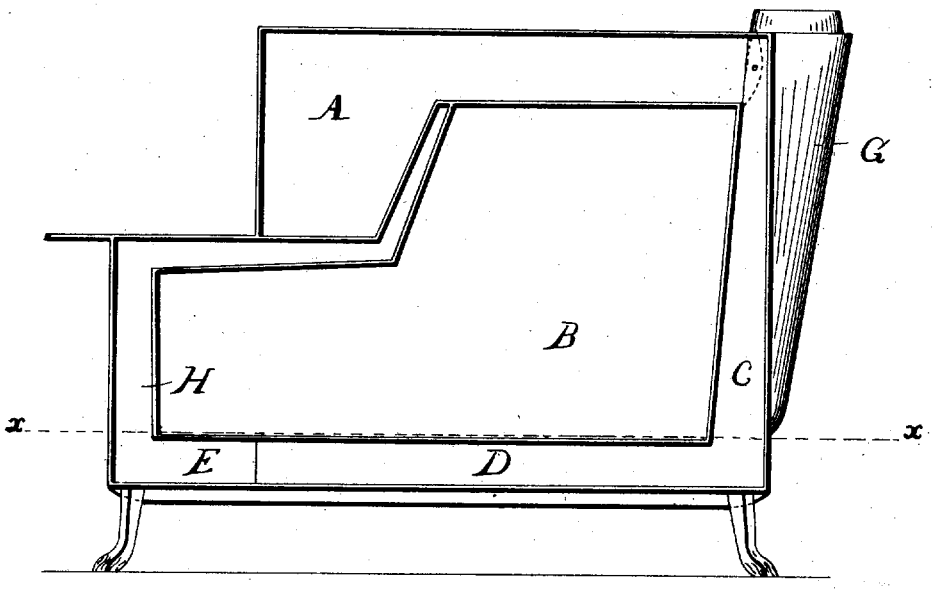
Figure 2:
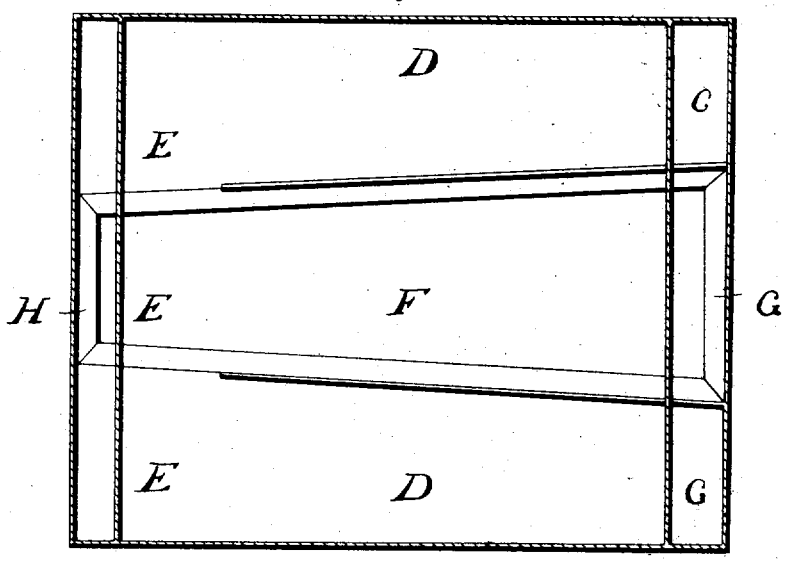

Figure 1 is a side elevation of one of my improved cooking-stoves, the near side plate thereof being removed for the purpose of showing the internal arrangements of the same; and Fig. 2 is a horizontal section of said stove in the line *x x* of Fig. 1.

Similar letters indicate like parts in both figures.

Cooking-stoves with extended ovens and descending flues, as they have been heretofore constructed, have three serious defects—viz., they have an exceedingly weak and feeble draft; the heat in the upper portion of the front part of the ovens of said stoves is of a scorching and burning character, and there is not enough heat carried into the flue-spaces under the front portion of the oven-bottoms of said stoves to raise the same to a baking-temperature. All these defects in the descending-draft cooking-stoves, and especially in that particular class of stoves which have extension-ovens as well as descending flues, I have completely remedied by the various improvements which I have invented and now desire to secure by Letters Patent.

My first improvement in the above-mentioned class of stoves consists in so proportioning the flue-spaces C, D, F, and G in said stoves that each of the flue-spaces will be of a regularly-tapering shape, substantially as represented in the accompanying drawings, the said flue-spaces being smallest at their induction ends and largest at their eduction ends, so that the products of combustion will pass through the said flue-spaces with the least possible amount of obstruction, while the pulsations that will be produced in the current of the said products of combustion, as they pass from one flue-space to another, will add greatly to the rapidity of their movement, and consequently a larger amount of heat will be carried into the flue-space E, under the front portion of the oven-bottom, than has ever been done in any other description of cooking-stove.

My second improvement in the above-mentioned class of cooking-stoves consists in such an arrangement of oven-plates and stove-plates as will form a flue-space, H, that will entirely separate the front of the oven of each stove from the front plate of the stove, and also from the hearth-plate and from the back plate of the fire-chamber A, as represented in Fig. 1, the said flue-space rising from the broad flue-space E, that extends under the entire front end of the oven-bottom, and being closed at top by the top plate of the oven. As the flue-space H opens freely into the flue-space E, and is perfectly closed at all other points, it will be perceived that the highly-heated back plate of the fire-chamber A, which forms a portion of the front side of said flue-space, will cause a rapid upward current of heated air and gases within that side of the flue-space, while there will be a descending current of the said air and gases within the opposite side of said flue-space which is not exposed to the action of a high degree of heat; and thus an active circulation of the air and gases within the flue-space H will be produced, which will conduct a large amount of heat from the back of the fire-chamber down into the flue-space E—the very place where it is most needed, and where it will produce three beneficial results—viz., first, the circulation of air and gases within the flue-space H prevents the fire-chamber from radiating a burning degree of heat into the front portion of the oven; second, the aforesaid circulation within the flue-space H carries a sufficient amount of heat into the flue-space E to raise the front portion of the bottom plate of the oven to a proper baking-temperature, uniform with the other portions of said plate; and, third, the increase of temperature within the flue-space E, produced by the circulation of air and gases within the flue-space H, gives to the stove a strong and vigorous draft in all situations where any other stove would have but a moderate draft.

Having thus fully described my improved descending-draft cooking-stove, what I claim therein as my invention, and desire to secure by Letters Patent, is--

1. The flaring enlargement of the side flues, C C and D D, from the space above the oven to the flue-space E, which extends under the entire front end of the oven, and also the flaring enlargement of the central flues, F, and of G from the flue-space E to the upper end, G, for the purpose of increasing the draft of the stove, substantially as herein set forth.

2. Separating the front of the oven from the front plate of the stove, and also from the hearth-plate and from the back plate of the fire-chamber, by means of the flue-space H, which communicates freely with the flue-space E, and is closed at all other points, the said arrangement enabling the flue-space H to arrest the great amount of heat that will be radiated from the back plate of the fire-chamber, and conduct the same (by means of the circulation which it will create in said flue-space) into the flue-space E, for the purpose of producing the beneficial results herein particularly set forth.

GILES F. FILLEY.

Witnesses:
GEO. W. BELL,
WM. A. MCBURNEY.